US011708491B2

(12) United States Patent
Said et al.

(10) Patent No.: US 11,708,491 B2
(45) Date of Patent: *Jul. 25, 2023

(54) POLYMERIC INSULATING FILMS

(71) Applicant: Essex Group LLC, Atlanta, GA (US)

(72) Inventors: Mohammad Mazhar Said, South Barrington, IL (US); Matthew E. Leach, Fort Wayne, IN (US)

(73) Assignee: Essex Furukawa Magnet Wire USA LLC, Atlanta, GA (US)

( * ) Notice: Subject to any disclaimer, the term of this patent is extended or adjusted under 35 U.S.C. 154(b) by 312 days.

This patent is subject to a terminal disclaimer.

(21) Appl. No.: 17/034,415

(22) Filed: Sep. 28, 2020

(65) Prior Publication Data

US 2021/0102068 A1   Apr. 8, 2021

Related U.S. Application Data (60) Provisional application No. 62/909,268, filed on Oct. 2, 2019.

(51) Int. Cl.
| | |
|---|---|
| *C08L 81/06* | (2006.01) |
| *C08L 67/00* | (2006.01) |
| *C08L 69/00* | (2006.01) |
| *C08L 79/08* | (2006.01) |
| *C08G 75/0204* | (2016.01) |
| *C08G 65/333* | (2006.01) |
| *C08K 3/22* | (2006.01) |
| *C08K 3/38* | (2006.01) |
| *C08K 3/36* | (2006.01) |
| *H02K 1/04* | (2006.01) |
| *C08L 81/04* | (2006.01) |

(52) U.S. Cl.
CPC ........ *C08L 81/06* (2013.01); *C08G 65/33331* (2013.01); *C08G 75/0204* (2013.01); *C08K 3/22* (2013.01); *C08K 3/36* (2013.01); *C08K 3/38* (2013.01); *C08L 67/00* (2013.01); *C08L 69/00* (2013.01); *C08L 79/08* (2013.01); *C08L 81/04* (2013.01); *H02K 1/04* (2013.01); *C08G 2650/40* (2013.01); *C08K 2003/2241* (2013.01); *C08K 2003/385* (2013.01); *C08L 2203/16* (2013.01); *C08L 2203/202* (2013.01); *C08L 2203/30* (2013.01); *C08L 2205/02* (2013.01); *C08L 2205/08* (2013.01)

(58) Field of Classification Search
None
See application file for complete search history.

(56) References Cited

U.S. PATENT DOCUMENTS

| 6,499,217 | B1 | 12/2002 | Yamada et al. |
|---|---|---|---|
| 8,609,264 | B2 | 12/2013 | Mitsuoka et al. |
| 2006/0057380 | A1 | 3/2006 | Weinberg et al. |
| 2015/0221412 | A1 | 8/2015 | Caudill et al. |
| 2016/0133355 | A1 | 5/2016 | Glew et al. |
| 2016/0196912 | A1 | 7/2016 | Sanner et al. |
| 2017/0178766 | A1* | 6/2017 | Saito .................... H01B 7/0275 |
| 2019/0136057 | A1 | 5/2019 | Jeol |

FOREIGN PATENT DOCUMENTS

| EP | 2290001 | 10/2017 |
|---|---|---|
| KR | 100927874 | 11/2009 |
| WO | 2018141527 | 8/2018 |
| WO | 2019018214 | 1/2019 |

OTHER PUBLICATIONS

Notification of Transmittal of the International Search Report and the Written Opinion of the International Searching Authority, or the Declaration for PCT/US20/24952; dated Jun. 24, 2020; 15 pages.
Chen, J et al. "Structures and Mechanical Properties of PEEK/PEI/PES Plastics Alloys Blent by Extrusion Molding Used for Cable Insulating Jacketing" Procedia Engineering; Publication [online], May 20, 2012 [retrieved May 27, 2020], Retrieved from the Internet: <URL: https://www.sciencedirect.com/science/article/pii/S1877705812015433?via%3Dihub>; 10 pages.
Notification of Transmittal of the International Search Report and the Written Opinion of the International Searching Authority, or the Declaration for PCT/US2020/053028, dated Dec. 17, 2020; 11 pages.

* cited by examiner

*Primary Examiner* — Robert T Butcher (57) ABSTRACT

Insulating films suitable for use in magnet wire, electrical machines, and other applications may include at least one layer formed from extruded material. The extruded material may include a blend of a first polymeric material and a second polymeric material different than the first polymeric material. The first polymeric material may include one of polyetheretherketone, polyaryletherketone, polyetherketoneketone, polyphenylsulfone, polyphenylene sulfide, or polybenzimidazole, and the second polymeric material may include one of polyphenylsulfone, polyetherimide, polyethersulfone, polyphenylene sulfide, polycarbonate, or polyester.

17 Claims, 7 Drawing Sheets

POLYMERIC INSULATING FILMS

CROSS-REFERENCE TO RELATED APPLICATION

This application claims priority to U.S. Provisional Patent Application No. 62/909,268, filed Oct. 2, 2019 and entitled "Polymeric Insulating Films". This application is also related to U.S. patent application Ser. No. 16/831,141, filed Mar. 26, 2020 and entitled "Magnet Wire with Thermoplastic Insulation, which claims priority to U.S. Provisional Patent Application No. 62/826,605, filed Mar. 29, 2019 and entitled "Magnet Wire with Thermoplastic Insulation". Each of these applications is incorporated by reference herein in its entirety.

TECHNICAL FIELD

Embodiments of the disclosure relate generally to polymeric insulating films and, more particularly, to polymeric insulating films formed from a blend of thermoplastic materials.

BACKGROUND

Insulating films are utilized in a wide variety of applications. For example, insulating films are utilized as insulating wraps on magnet wire (also referred to as winding wire or magnetic winding wire), as phase and slot insulation in electric motors, transformers, and other electric devices, and/or as insulating layers in printed circuit boards. Conventional insulating films are typically formed from relatively high performance materials. Examples of conventional insulating films include films formed from aramid polymers (e.g., Nomex® films manufactured by DuPont, aromatic polyamide, etc.) and films formed from other high performance thermoplastic resins, such as polyether ether ketone ("PEEK").

However, conventional high performance thermoplastics are expensive and increase the cost of insulating films. It is also possible to increase insulation performance beyond that provided by conventional thermoplastic resins. Accordingly, there is an opportunity for improved polymeric insulating films, and more particularly, improved polymeric insulating films that include thermoplastic layers formed from various blends of two or more resins or materials.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Various embodiments of the present disclosure are directed to polymeric insulating films that include one or more layers formed from a polymeric blend or mixture of two or more polymeric materials. In other words, a film layer may include at least a first polymeric material and a second polymeric material different from the first polymeric material. In certain embodiments, a polymeric insulating film (or film) may be formed with a single layer, and the single layer may be formed from a polymeric blend. In other embodiments, a film may be formed with a plurality of layers, and at least one of the layers may be formed from a polymeric blend. For example, a film may include a plurality of layers of insulating material, and one of the plurality of insulating layers may be formed from a polymeric blend. As another example, a film may include a plurality of layers of insulating material that are each formed from a respective polymeric blend, and the respective polymeric blends may include similar materials, different materials, and/or different blend ratios.

Other embodiments of the disclosure are directed to methods for forming polymeric insulating films that include one or more layers formed from a polymeric blend. Two or more polymeric materials may be provided for a polymeric blend and utilized to extrude a film layer. In certain embodiments, the film layer may be utilized to form a single layer film. In other embodiments, the film layer may be combined with one or more other layers in a multi-layer film.

A wide variety of suitable materials and/or combinations of materials may be incorporated in a polymeric blend as desired in various embodiments. Examples of suitable materials that may be included in a blend include, but are not limited to, polyetheretherketone ("PEEK"), polyetherketoneketone ("PEKK"), polyaryletherketone ("PAEK"), polyetherimide ("PEI"), polyphenylsulfone ("PPSU"), polyethersulfone ("PESU"), polypheylene sulfide ("PPS"), polybenzimidazole ("PBI"), polycarbonate, one or more polyesters (e.g., polyethylene terephthalate ("PET"), etc.), one or more copolyesters, polyamide, and/or thermoplastic polyimide ("TPI"). Additionally, two or more polymeric materials may be blended or mixed together at any suitable blend rates or ratios. For example, each polymeric material may constitute between approximately 1.0% and approximately 99.0% by weight of a polymeric blend. In certain embodiments, each polymeric material may constitute between approximately 5.0% and approximately 95.0% by weight of the polymeric blend. In other embodiments, each polymeric material may constitute between approximately 10.0% and approximately 90.0% by weight of the polymeric blend. Polymeric materials and relative amounts of materials incorporated into a blend may be selected based on a wide variety of suitable factors including, but not limited to, costs of the materials, processing characteristics, desired dielectric breakdown, desired partial discharge inception voltage ("PDIV"), desired cut through, desired thermal aging properties, desired temperature rating, etc. A few example blends that may be utilized are described in greater detail herein.

As desired in various embodiments, one or more additives may be incorporated into a polymeric blend. For example, one or more compatabilizers may be added to a polymeric blend in order to increase the stability of polymeric blend. In other embodiments, a stable polymeric blend may be formed without the use of compatabilizers. As another example, one or more suitable filler materials may be added to a blend. Examples of suitable filler materials include, but are not limited to, inorganic materials such as metals, transition metals, lanthanides, actinides, metal oxides, and/or hydrated oxides of suitable materials such as aluminum, tin, boron, germanium, gallium, lead, silicon, titanium, chromium, zinc, yttrium, vanadium, zirconium, nickel, etc.; suitable organic materials such as polyaniline, polyacetylene, polyphenylene, polypyrrole, other electrically conductive particles; and/or any suitable combination of materials. In certain embodiments, the filler material(s) may enhance corona resistance and/or one or more thermal properties (e.g., temperature resistance, cut-through resistance, heat shock, etc.). The particles of a filler material may have any suitable dimensions, and any suitable blending ratio between filler material and polymeric materials may be utilized.

As a result of forming one or more layers of a polymeric insulating film from a polymeric blend, the cost of the film may be reduced relative to conventional films that utilize certain high performance thermoplastic polymers, such as PEEK. For example, a polymeric blend may provide similar performance (e.g., PDIV, dielectric breakdown, temperature rating, etc.) to PEEK while having a lower overall material cost. Certain polymeric blends may provide improved electrical performance (e.g., dielectric breakdown, PDIV, etc.), temperature performance, and/or mechanical performance relative to conventional thermoplastic polymers, such as PEEK. In certain cases, the use of polymeric blends may also provide for faster processing times.

Additionally, in certain embodiments, at least one layer of electrically conductive material may be incorporated into a film. For example, a layer of electrically conductive material may be formed on an underlying or base insulating layer. As another example, a layer of electrically conductive material may be sandwiched between two insulating layers. A wide variety of suitable electrically conductive materials may be utilized as desired to form an electrically conductive layer, such as metallic materials, etc. An electrically conductive layer may be utilized for a wide variety of purposes. For example, a film may be incorporated into a printed circuit board, and an electrically conductive layer may be utilized to form traces and/or connections on the printed circuit board. As another example, an electrically conductive layer may be utilized to provide electromagnetic shielding.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1A:
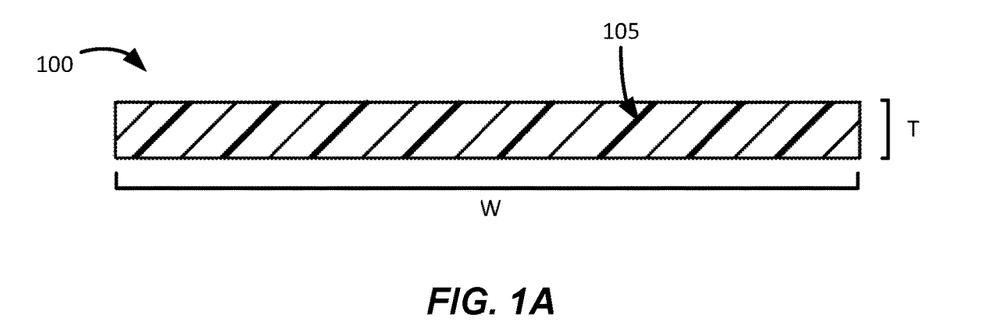
FIGS. 1A-1C are cross-sectional views of example polymeric insulating films, according to illustrative embodiments of the disclosure.
Figure 1B:
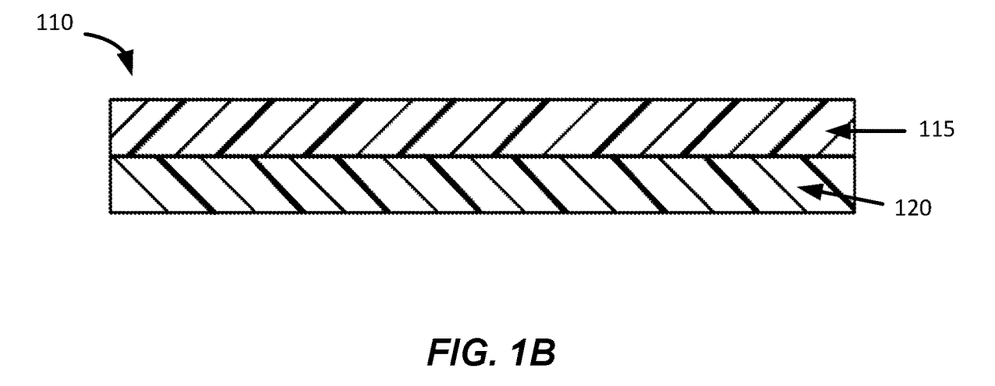
Figure 1C:
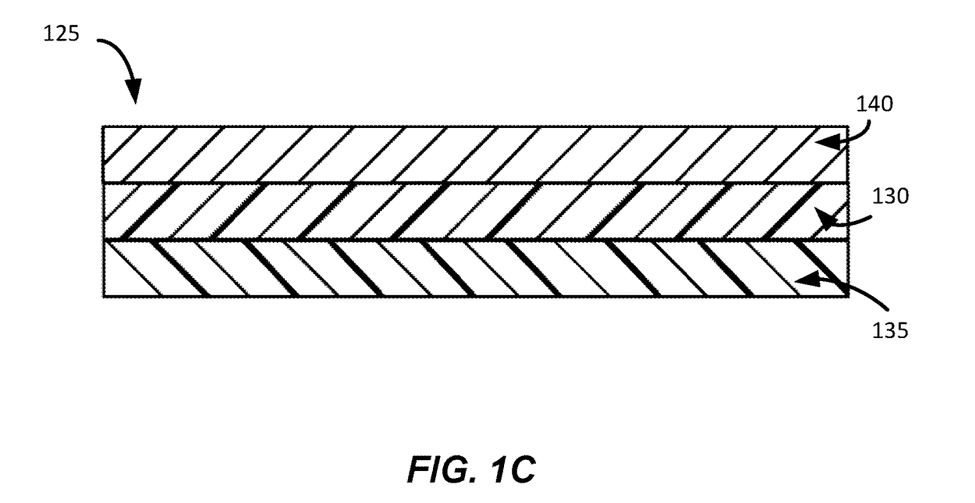

FIGS. 1A-1C illustrate cross-sectional views of example polymeric insulating films in accordance with various illustrative embodiments of the disclosure. FIG. 1A illustrates an example film 100 that includes a single layer 105 of polymeric insulating material. FIG. 1B illustrates an example film 110 that includes a plurality of layers 115, 120 of polymeric insulating material. FIG. 1C illustrates an example film 125 that includes one or more layers 130, 135 of polymeric insulating material and a layer 140 of electrically conductive material 140. A wide variety of other suitable film constructions may be formed in accordance with other embodiments of the disclosure, and the illustrated constructions are provided by way of non-limiting example only.

Regardless of the number of layers incorporated into a film, in accordance with an embodiment of the disclosure, at least one insulating layer may be formed from a polymeric blend or mixture of two or more polymeric materials. In other words, a film layer may include at least a first polymeric material and a second polymeric material different from the first polymeric material. Such an insulating layer may be referred to herein as a blended layer. In certain embodiments, as shown in FIG. 1A, a film 100 may be formed with a single layer 105, and the single layer 105 may be formed as a blended layer. In other embodiments, a film may be formed with a plurality of layers, and at least one of the layers may be formed from a polymeric blend. For example, a film (such as the film 110 of FIG. 1B) may include a plurality of layers of insulating material, and one of the plurality of insulating layers may be formed as a blended layer. As another example, a film may include a plurality of layers of insulating material that are each formed as blended layers. In certain embodiments, each of the blended layers may be formed from the same blend of materials. In other embodiments, at least two of the blended layers may be formed from different respective blends of materials. For example, at least two of the plurality of blended layers may utilized a different group of respective materials and/or may utilize a different blend ratio of materials.

The blended layer 105 of FIG. 1A is described in greater detail below. It will be appreciated that any of the blended layers incorporated into the films 110, 125 of FIGS. 1B and 1C may be formed with similar constructions and/or via similar techniques as those described with respect to the blended layer 105 of FIG. 1A.

A wide variety of suitable materials and/or combinations of materials may be incorporated in a polymeric blend utilized to form a blended layer 105 as desired in various embodiments. Examples of suitable materials that may be included in a polymeric blend include, but are not limited to, polyetheretherketone ("PEEK"), polyetherketoneketone ("PEKK"), polyetheretherketoneketone ("PEEKK"), polyetherketone ("PEK"), polyaryletherketone ("PAEK"), other suitable polymers that include at least one ketone group, polyetherimide ("PEI") such as Ultem® marketed by Sabic Global Technologies, polyphenylsulfone ("PPSU") such as Radel® marketed by Solvay Specialty Polymers USA, polyethersulfone ("PESU"), polypheylene sulfide ("PPS"), polybenzimidazole ("PBI"), polycarbonate, one or more polyesters (e.g., polyethylene terephthalate ("PET"), etc.), one or more copolyesters, polyamide, and/or thermoplastic polyimide ("TPI").

In certain embodiments, a first polymeric material included in a blend may be or may include one of polyetheretherketone, polyaryletherketone, polyetherketoneketone, polyphenylsulfone, polyphenylene sulfide, or polybenzimidazole. A second polymeric material included in the blend may be or may include one of polyphenylsulfone, polyetherimide, polyethersulfone, polyphenylene sulfide, polycarbonate, or polyester. In other embodiments, a polymeric blend may include at least two materials selected from a group consisting of polyetheretherketone, polyaryletherketone, polyetherketoneketone, polyphenylsulfone, polyphenylene sulfide, polybenzimidazole, polyethersulfone, polycarbonate, and polyester.

Additionally, two or more polymeric materials may be blended or mixed together at any suitable blend rates or ratios within a polymeric blend. For example, each polymeric material may constitute between approximately 1.0% and approximately 99.0% of a polymeric blend. In certain embodiments, each polymeric material incorporated into a blend (e.g., a first polymeric material, a second polymeric material, etc.) may constitute approximately 5, 10, 15, 20, 25, 30, 40, 45, 50, 60, 70, 75, 80, 90, or 95% by weight of the blend, a weight percentage included in a range between any two of the above values (e.g., between approximately 5 and 95%, between approximately 10 and 90%, etc.), or a weight percentage included in a range bounded on either a minimum or maximum end by one of the above values (e.g., at least 5%, at least 10%, no more than 95%, no more than 90%, etc.).

Polymeric materials and relative amounts of materials incorporated into a blend may be selected based on a wide variety of suitable factors including, but not limited to, costs of the materials, processing characteristics, desired dielectric breakdown, desired partial discharge inception voltage ("PDIV"), desired cut through, desired thermal aging properties, desired temperature rating, etc. A few example blends that may be utilized are described in greater detail below. Additionally, in certain embodiments, a blend may include a first polymeric material that is a semi-crystalline material (e.g., PEEK, PPS, etc.) and a second polymeric material that is an amorphous material (e.g., PPSU, etc.). Combination of a semi-crystalline and an amorphous material is one method that permits a desired crystallinity of a blend to be achieved. In certain embodiments, a blend may be formed with any suitable crystallinity, such as a crystallinity of at least approximately 25%, a crystallinity of at least approximately 30%, etc. Additionally, in certain embodiments, the use of a polymeric blend may increase the glass transition temperature of the blend relative to certain costly single polymeric materials.

In certain embodiments, a polymeric blend may include a combination of PESU and PPSU. For example, a polymeric blend may include approximately 90% by weight of PESU and approximately 10% by weight of PPSU. As another example, a polymeric blend may include approximately 70% by weight of PESU and approximately 30% by weight of PPSU. As yet another example, a polymeric blend may include approximately 50% by weight of PESU and approximately 50% by weight of PPSU. In other embodiments, a polymeric blend may include approximately 5, 10, 20, 25, 30, 40, 50, 60, 70, 80, 90, or 95% by weight of PESU, an amount of PESU included in a range between any two of the above values (e.g., between 5 and 95%, between 10 and 90%, etc.), or an amount of PESU included in a range bounded on either a minimum or maximum end by one of the above values (e.g., at least 5%, at least 10%, etc.). Additionally, the polymeric blend may include approximately 5, 10, 20, 25, 30, 40, 50, 60, 70, 80, 90, or 95% by weight of PPSU, an amount of PPSU included in a range between any two of the above values (e.g., between 5 and 95%, between 10 and 90%, etc.), or an amount of PPSU included in a range bounded on either a minimum or maximum end by one of the above values (e.g., at least 5%, at least 10%, etc.). Indeed, a wide variety of suitable blend ratios between PESU and PPSU may be utilized as desired.

In other embodiments, a polymeric blend may include a combination of PEI and PEEK. For example, a polymeric blend may include approximately 90% by weight of PEI and approximately 10% by weight of PEEK. As another example, a polymeric blend may include approximately 70% by weight of PEI and approximately 30% by weight of PEEK. As yet another example, a polymeric blend may include approximately 50% by weight of PEI and approximately 50% by weight of PEEK. In other embodiments, a polymeric blend may include approximately 5, 10, 20, 25, 30, 40, 50, 60, 70, 80, 90, or 95% by weight of PEI, an amount of PEI included in a range between any two of the above values (e.g., between 5 and 95%, between 10 and 90%, etc.), or an amount of PEI included in a range bounded on either a minimum or maximum end by one of the above values (e.g., at least 5%, at least 10%, etc.). Additionally, the polymeric blend may include approximately 5, 10, 20, 25, 30, 40, 50, 60, 70, 80, 90, or 95% by weight of PEEK, an amount of PEEK included in a range between any two of the above values (e.g., between 5 and 95%, between 10 and 90%, etc.), or an amount of PEEK included in a range bounded on either a minimum or maximum end by one of the above values (e.g., at least 5%, at least 10%, etc.). Indeed, a wide variety of suitable blend ratios between PEI and PEEK may be utilized as desired.

In other embodiments, a polymeric blend may include a combination of PPSU and PEI. For example, a polymeric blend may include approximately 90% by weight of PPSU and approximately 10% by weight of PEI. As another example, a polymeric blend may include approximately 70% by weight of PPSU and approximately 30% by weight of PEI. As yet another example, a polymeric blend may include approximately 50% by weight of PPSU and approximately 50% by weight of PEI. In other embodiments, a polymeric blend may include approximately 5, 10, 20, 25, 30, 40, 50, 60, 70, 80, 90, or 95% by weight of PPSU, an amount of PPSU included in a range between any two of the above values (e.g., between 5 and 95%, between 10 and 90%, etc.), or an amount of PPSU included in a range bounded on either a minimum or maximum end by one of the above values (e.g., at least 5%, at least 10%, etc.). Additionally, the polymeric blend may include approximately 5, 10, 20, 25, 30, 40, 50, 60, 70, 80, 90, or 95% by weight of PEI, an amount of PEI included in a range between any two of the above values (e.g., between 5 and 95%, between 10 and 90%, etc.), or an amount of PEI included in a range bounded on either a minimum or maximum end by one of the above values (e.g., at least 5%, at least 10%, etc.). Indeed, a wide variety of suitable blend ratios between PPSU and PEI may be utilized as desired.

In other embodiments, a polymeric blend may include a combination of PPSU and PEEK. For example, a polymeric blend may include approximately 90% by weight of PPSU and approximately 10% by weight of PEEK. As another example, a polymeric blend may include approximately 70% by weight of PPSU and approximately 30% by weight of PEEK. As yet another example, a polymeric blend may include approximately 50% by weight of PPSU and approximately 50% by weight of PEEK. In other embodiments, a polymeric blend may include approximately 5, 10, 20, 25, 30, 40, 50, 60, 70, 80, 90, or 95% by weight of PPSU, an amount of PPSU included in a range between any two of the above values (e.g., between 5 and 95%, between 10 and 90%, etc.), or an amount of PPSU included in a range bounded on either a minimum or maximum end by one of the above values (e.g., at least 5%, at least 10%, etc.). Additionally, the polymeric blend may include approximately 5, 10, 20, 25, 30, 40, 50, 60, 70, 80, 90, or 95% by weight of PEEK, an amount of PEEK included in a range between any two of the above values (e.g., between 5 and 95%, between 10 and 90%, etc.), or an amount of PEEK included in a range bounded on either a minimum or maximum end by one of the above values (e.g., at least 5%, at least 10%, etc.). Indeed, a wide variety of suitable blend ratios between PPSU and PEEK may be utilized as desired.

A wide variety of other suitable combinations of thermoplastic and/or other polymeric materials may be utilized to form polymeric blends. The polymeric blends discussed above are provided by way of non-limiting example only. Other blends may include other combinations and blend ratios of polymeric materials. For example, blends may include any combinations of the polymeric materials described herein at any of the described ratios and/or weight percentages. For example, a relatively low cost polymeric blend may be formed by combining polycarbonate and polyester.

Additionally, although the blends discussed above describe a mixture of two polymeric materials, other polymeric blends may include three or more polymeric materials combined at any suitable blend ratios. Any of the materials discussed herein may be utilized for a triple polymeric blend or for a blend with more than three polymeric components. A few example triple blends that may be utilized in various embodiments include, but are not limited to, a blend of PEEK, PPSU, and PESU, a blend of PEEK, PPSU, and PPS, a blend of PAEK, PESU, and PPSU, a blend of PAEK, PESU, and PPS, a blend of PEEK, PEI, and PPSU, a blend of PEEK, PEI, and PESU, and a blend of PEEK, PEI, and PPS. Any suitable blend ratios may be utilized in these blends. For example, the polymeric materials may be combined such that each material constitutes between 5 and 90% by weight of the blend or such that each material constitutes between 10 and 80% by weight of the blend. For example, each polymeric material may constitute approximately 5, 10, 15, 20, 25, 30, 35, 40, 45, 50, 55, 60, 65, 70, 75, 80, 85, or 90% by weight of the blend, a weight percentage included in a range between any two of the above values, or a weight percentage included in a range bounded on either the minimum or maximum end by one of the above values.

In certain embodiments, a polymeric blend may be formed without the addition or use of compatabilizers. Certain polymeric blends remain stable even without compatabilizers, are partially miscible, and do not affect physical properties of the polymeric materials. By contrast, conventional teachings indicate that compatabilizers are desirable. In other embodiments, one or more compatabilizers may be added to a polymeric blend as additives in order to increase the stability of the polymeric blend. Examples of suitable compatabilizers include, but are not limited to, silanes, titanates, zirconates, polyetherimide, epoxy cresol novolac resin, metal carbonates (e.g., potassium carbonate, cesium carbonate, lithium carbonate, etc.), magnesium peroxide, sulfur, and/or maleic anhydride. One or more compatabilizers may be added at any suitable ratio or weight percentage. For example, one or more compatabilizers may constitute between approximately 0.1% and approximately 30% by weight of a polymeric blend. In various embodiments, one or more compatabilizers may constitute approximately 0.1, 0.2, 0.25, 0.3, 0.4, 0.5, 0.75, 1.0, 2.0, 2.5, 5.0, 7.5, 10.0, 12.5, 15.0, 17.5, 20.0, 22.5, 25.0, 27.5, or 30.0% by weight of a polymeric blend, a weight percentage included in a range between any two of the above values, or a weight percentage included in a range bounded on either the minimum or maximum end by one of the above values.

A wide variety of other suitable filler materials may be added to a polymeric blend as desired in various embodiments of the disclosure. Examples of suitable filler materials include, but are not limited to, inorganic materials such as metals, transition metals, lanthanides, actinides, metal oxides, and/or hydrated oxides of suitable materials such as aluminum, tin, boron, germanium, gallium, lead, silicon, titanium, chromium, zinc, yttrium, vanadium, zirconium, nickel, etc. (e.g., titanium dioxide, boron nitride, porous boron nitride, silica dioxide, etc.); suitable organic materials such as polyaniline, polyacetylene, polyphenylene, polypyrrole, other electrically conductive particles; and/or any suitable combination of materials. In certain embodiments, the filler material(s) may enhance corona resistance and/or one or more thermal properties (e.g., temperature resistance, cut-through resistance, heat shock, etc.). The particles of a filler material may have any suitable dimensions, such as any suitable diameters. In certain embodiments, a filler material may include nanoparticles. Further, any suitable blend or mixture ratio between filler material and polymeric materials may be utilized.

A wide variety of suitable methods and/or techniques may be utilized to form one or more polymeric insulating layers of a film 100, such as one or more blended layers 105. In certain embodiments, a polymeric insulating layer may be extruded in a suitable shape by a suitable extrusion device. For example, a polymeric insulating layer may be extruded via a suitable extrusion device (e.g., a single screw extruder, a twin screw extruder, etc.) that is equipped with an extrusion crosshead suitable for forming a relatively thin film layer, such as a relatively thin film strip crosshead. As desired, any number of suitable polymeric insulating layers may be co-extruded during the formation of a film 100. Examples of suitable systems that may be utilized to extrude films are described in greater detail below with reference to FIGS. 2A-2B. An extrusion process may result in the formation of an insulating layer from approximately 100% solid material. In other words, an extruded insulating layer may be substantially free of any solvents.

An insulating layer incorporated into a film 100, such as a blended layer 105, may be formed with any suitable thickness as desired in various embodiments. For example, an insulating layer may be formed with a thickness between approximately 25 μm (approximately 0.001 inches) and approximately 200 μm (approximately 0.0078 inches). In various embodiments, the insulating insulation may have a thickness of approximately 25 μm (0.001 inches), 50 μm (0.002 inches), 75 μm (0.003 inches), 100 μm (0.004 inches), 125 μm (0.005 inches), 150 μm (0.006 inches), 175 μm (0.007 inches), and 200 μm (0.008 inches), a thickness included in a range between any two of the aforementioned values (e.g., a thickness between approximately 0.003 and approximately 0.008 inches, etc.), or a thickness included in a range bounded on either a minimum or maximum end by one of the aforementioned values (e.g., a thickness of approximately 200 μm or less, etc.). Additionally, in certain embodiments, an insulating layer may be formed to have a rectangular cross-sectional shape. Other cross-sectional shapes may be utilized as desired. In various embodiments, corners of an insulating layer may be rounded, sharp, smoothed, curved, angled, truncated, or otherwise formed.

Additionally, in certain embodiments, the extrusion process utilized to form an insulating layer may be controlled such that the insulating layer has a relatively uniform thickness along its longitudinal length. In other words, the insulating layer may be formed with a concentricity that is approximately close to 1.0. The concentricity of an insulating layer is the ratio of the thickness of the insulating layer to the thinness of the insulating layer at any given cross-sectional point along a longitudinal length of the insulating layer. In certain embodiments the insulating layer may be formed with a concentricity between approximately 1.0 and 1.5. For example, the insulating layer may be formed with a concentricity of approximately 1.0, 1.05, 1.1, 1.15, 1.2, 1.25, 1.3, 1.35, 1.4, 1.45, or 1.5, a concentricity between any two of the above values, or a concentricity bounded on a maximum end by one of the above values (e.g., a concentricity of approximately 1.3 or less, a concentricity of approximately 1.1. or less, etc.).

Any number of suitable layers may be incorporated into a film 100 as desired in various embodiments. For example, a film 100 may include any suitable number of blended layers, other insulating layers (e.g., insulating layers formed from a single polymeric material, etc.), and/or electrically conductive layers, etc. As shown in FIG. 1A, a film 100 may include a single layer 105 formed as a blended layer. In other embodiments, such as the embodiments illustrated in FIGS. 1B and 1C, a film 100 may include a plurality of layers. As desired in various embodiments, any number of layers incorporated into a film 100 may be formed as blended layers. Additionally, in the event that a plurality of blended layers are incorporated into a film 100, the various layers may be formed with any suitable blends. For example, each of the plurality of layers may be formed from the same or similar blended polymers and/or ingredients. As another example, at least two of the plurality of blended layers may be formed from different ingredients and/or with different blend ratios of respective ingredients. Each layer of a film 100 may be formed with any suitable thickness, such as any of the thicknesses discussed above.

In certain embodiments, one or more electrically conductive layers may be incorporated into a film 100. As an example, FIG. 1C illustrates an example film 125 that includes an electrically conductive layer 140 combined with one or more insulating layers 130, 135. In certain embodiments, a layer of electrically conductive material may be formed on an underlying or base insulating layer. For example, a topmost layer of a film 100 may be formed as an electrically conductive layer. In other embodiments, an electrically conductive layer may be sandwiched between two insulating layers. A wide variety of suitable electrically conductive materials may be utilized as desired to form an electrically conductive layer. Examples of suitable materials include, but are not limited to, copper, aluminum, annealed copper, oxygen-free copper, silver-plated copper, nickel plated copper, copper clad aluminum ("CCA"), silver, gold, palladium, platinum, a conductive alloy, a bimetal, carbon nanotubes, or any other suitable electrically conductive material. An electrically conductive layer may also be formed with any suitable thickness, such as any of the thickness discussed above. An electrically conductive layer may be utilized for a wide variety of purposes. For example, a film may be incorporated into a printed circuit board, and an electrically conductive layer may be utilized to form traces and/or connections on the printed circuit board. As another example, an electrically conductive layer may be utilized to provide electromagnetic shielding.

As desired in various embodiments, an electrically conductive layer (e.g., electrically conductive layer 140 illustrated in FIG. 1C) may be formed on an underlying layer with a wide variety of suitable layouts and/or configurations. For example, an electrically conductive layer may be formed as a longitudinally continuous layer that spans partially or substantially across a widthwise dimensions of a film. A relatively continuous layer may optionally be subsequently etched into a desired pattern. As another example, an electrically conductive layer may be formed with a plurality of discontinuous sections or patches of material along a longitudinal and/or a widthwise dimensions. As yet another example, an electrically conductive layer may include a plurality of elements (e.g., patches, sections, traces, etc.) arranged in a desired pattern or other suitable configuration. For example, an electrically conductive layer may include a plurality of traces, pins, and/or circuits desired to be incorporated into a printed circuit board or other suitable electronic device. A wide variety of other suitable configurations may be utilized as desired for an electrically conductive layer.

Additionally, regardless of the number of layers incorporated into a film 100, the film 100 may be formed with any suitable overall thickness "T". For example, a film 100 may be formed with a thickness between approximately 25 μm (approximately 0.001 inches) and approximately 600 μm (approximately 0.0236 inches). In various embodiments, a film 100 may have a thickness of approximately 25 μm (0.001 inches), 50 μm (0.002 inches), 75 μm (0.003 inches), 100 μm (0.004 inches), 125 μm (0.005 inches), 150 μm (0.006 inches), 175 μm (0.007 inches), 200 μm (0.008 inches), 250 μm (0.01 inches), 300 μm (0.012 inches), 350 μm (0.014 inches), 400 μm (0.016 inches), 450 μm (0.018 inches), 500 μm (0.02 inches), 550 μm (0.022 inches), or 600 μm (0.024 inches), a thickness included in a range between any two of the aforementioned values, or a thickness included in a range bounded on either a minimum or maximum end by one of the aforementioned values (e.g., a thickness of approximately 200 μm or less, etc.).

Further, a film 100 may be formed with any suitable width "W". For example, a film 100 may be formed with a width between approximately 10 mm (0.39 inches) and approximately 2000 mm (78.74 inches). In various embodiments, a film 100 may have a width of approximately 10 mm (0.39 inches), 20 mm (0.79 inches), 30 mm (1.18 inches), 40 mm (1.57 inches), 50 mm (1.97 inches), 60 mm (2.36 inches), 70 mm (2.76 inches), 80 mm (3.15 inches), 90 mm (3.54 inches), 100 mm (3.94 inches), 150 mm (5.90 inches), 200 mm (7.87 inches), 250 mm (9.84 inches), 300 mm (11.81 inches), 400 mm (15.75 inches), 500 mm (19.69 inches), 750 mm (29.53 inches), 1000 mm (39.37 inches), 1250 mm (49.21), 1500 mm (59.06), 1750 mm (68.90), or 2000 mm (78.74 inches), a width included in a range between any two of the aforementioned values, or a width included in a range bounded on either a minimum or maximum end by one of the aforementioned values (e.g., a width of approximately 500 mm or less, etc.).

Once a film 100 has been formed, the film may optionally be slit into two or more smaller or narrower films. In other words, an original film 100 may be subsequently cut, slit, or otherwise processed in order to form any desired number of other films. For example, a film 100 may be cut into any number of suitable films having desired finish widths (e.g., widths appropriate for one or more desired film applications).

As a result of forming an insulating layer of a film 100 from a polymeric blend, the cost of a film 100 may be reduced relative to conventional films that utilize certain high performance thermoplastic polymers, such as PEEK. For example, a polymeric blend may provide similar performance (e.g., PDIV, dielectric breakdown, temperature rating, etc.) to PEEK or PPSU while having a lower overall material cost. As one non-limiting example, a polymeric blend containing PEEK blended with a lower cost polymeric material (e.g., PEI, etc.) may provide similar or better performance than PEEK while having an overall lower cost.

Additionally, certain polymeric blends may provide improved performance relative to certain unblended conventional polymers (e.g., PEEK, etc.). For example, a polymeric blend may provide improved electrical performance (e.g., dielectric breakdown, PDIV, etc.), temperature performance (e.g., thermal aging, cut through), and/or mechanical performance (e.g., bend test, concentricity, solvent resistance, fluid resistance, etc.) relative to conventional thermoplastic polymers utilized in films. In certain cases, the use of a polymeric blend may also provide for faster processing times, lower processing temperatures, improved processing conditions, and/or improved physical and electrical properties.

When a film 100 is utilized as or incorporated into an insulation system for magnet wire, an electrical device, or another desired application, the film 100 and/or the insulation system may have a wide variety of suitable electrical performance parameters. For example, the film 100 and/or the insulation system may have a wide variety of suitable PDIV values and/or dielectric strength or breakdown strength values. In certain embodiments, a film 100 and/or an insulation system incorporating the film 100 may provide a PDIV value at 25° C. of at least approximately 1400, 1450, 1500, 1550, 1600, 1700, 1800, or 1900 volts, or a PDIV value included in a range between any two of the above values. Similar, in certain values, a film 100 and/or an insulation system incorporating the film 100 may provide a dielectric strength value (e.g., a dielectric strength value measured by a suitable industry standard test such as a shotbox or foil test, etc.) of at least approximately, 12,000, 12,500, 13,000, 13,500, 14,000, 14,500, 15,000, 15,500, 16,000, 16,500, 17000, 17,500, or 18,000 volts, or a dielectric strength value included in a range between any two of the above values.

In certain embodiments, a polymeric blend may provide benefits as a result of incorporating two or more polymeric materials into the blend. For example, a first polymeric material may provide relatively high electrical performance while a second polymeric material provides relatively high mechanical performance. A blend formed from the two polymeric materials may provide a combination of desirable electrical and mechanical performance. Other combinations of benefits may be achieved with different polymeric blends. Additionally, a mixture or blend rate of two or more polymeric materials may be based at least in part upon desired performance criteria provided by the polymeric blend. Indeed, polymeric materials incorporated into a blend may be selected and/or associated ratios of the materials may be selected in order to attain a wide variety of suitable electrical and/or mechanical performance properties including, but not limited to, PDIV values, dielectric strengths, cut through values, heat shock values, and/or oil resistance values.

The films 100, 110, 125 described above with reference to FIGS. 1A-1C are provided by way of example only. A wide variety of other suitable films may be formed in accordance with embodiments of the disclosure. These films may include more or less components than the films 100, 110, 125 of FIGS. 1A-1C. For example, a film may be formed with any suitable layer construction. The present disclosure envisions a wide variety of suitable films that may include one or more blended layers.

Figure 2A:
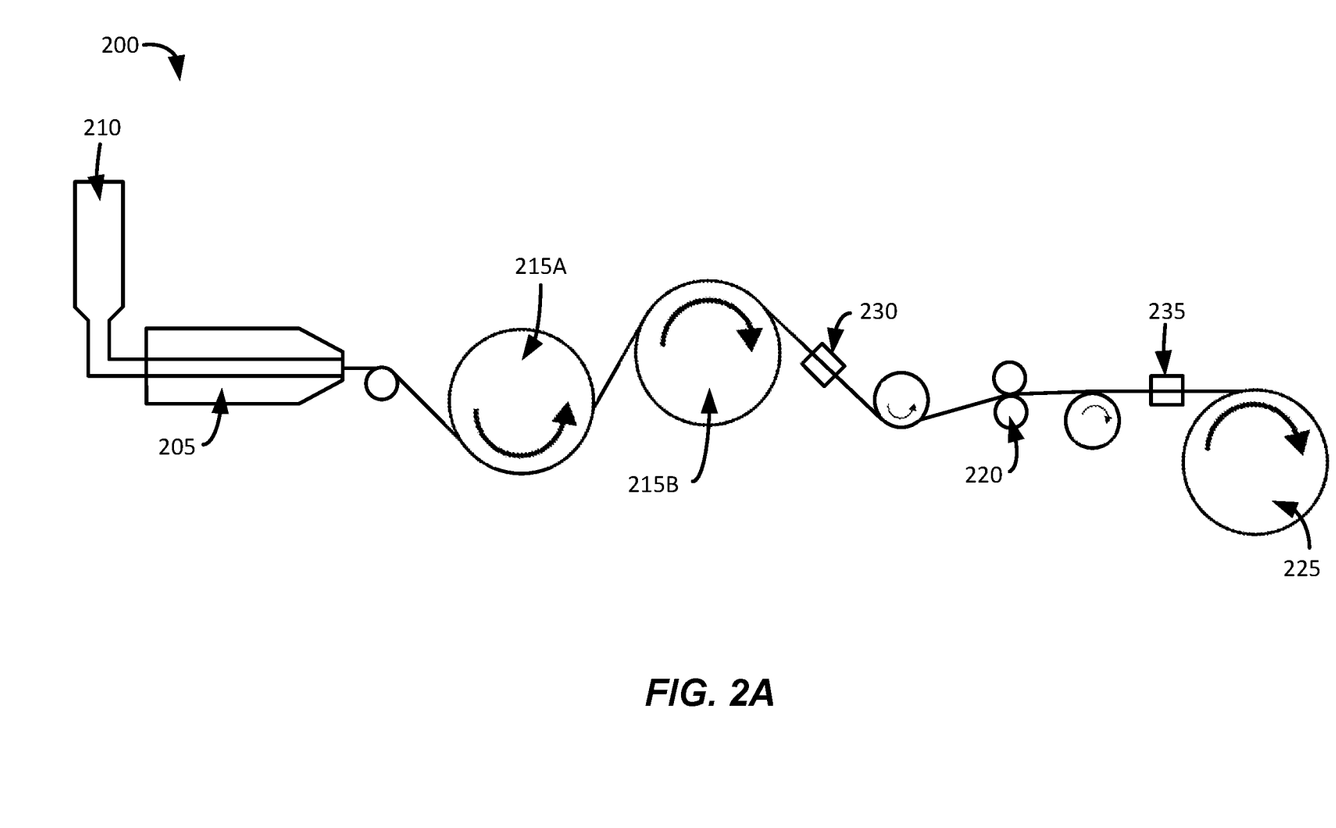
FIGS. 2A-2B are schematic diagrams of example systems that may be utilized to form polymeric insulating films, according to illustrative embodiments of the disclosure.
Figure 2B:
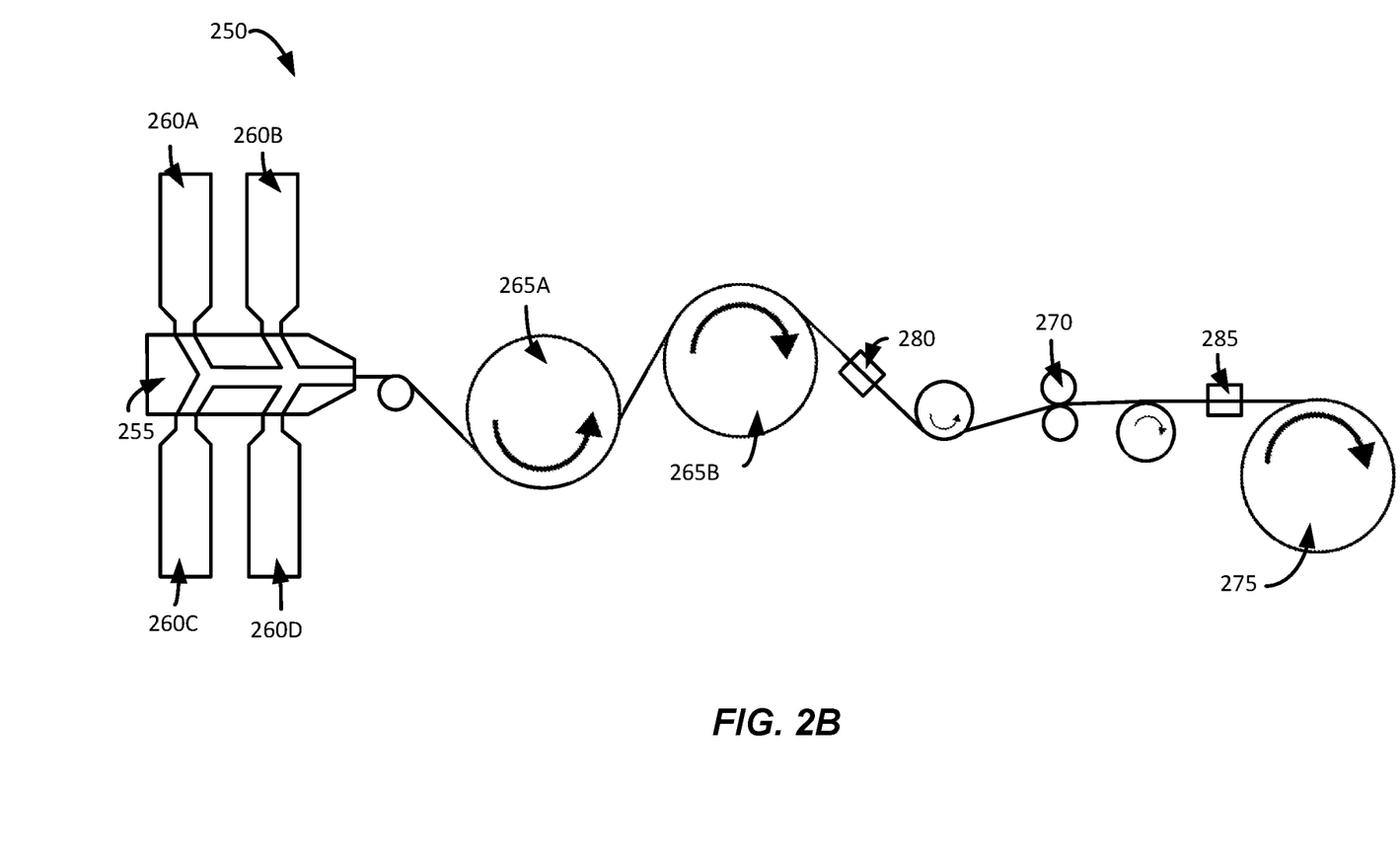

A wide variety of suitable systems and/or methods may be utilized as desired to form one or more blended layers incorporated into a film, such as any of the films 100, 110, 125 illustrated in FIGS. 1A-1C. Schematic diagrams of two example systems 200, 250 for forming extruded film layers for incorporation into a film are illustrated in FIGS. 2A-2B. Each system 200, 250 may include a wide variety of components that facilitate extrusion of one or more blended and/or other insulating layers. As shown in FIG. 2A, an example system 200 may include an extrusion device 205, one or more sources 210 of polymeric material, one or more chill rolls 215A, 215B, an edge trim device 220, and/or a take-off 225. Each of these components, as well as other components that may optionally be incorporated into the system 200, are described in greater detail below. The example system 250 of FIG. 2B may include similar components to the system 200 of FIG. 2A; however, the system 250 of FIG. 2B may be configured to co-extrude a plurality of insulating layers.

With reference to FIG. 2A, the system 200 may include a suitable extrusion device 205 configured to receive one or more polymeric materials and extrude one or more layers of a film. In accordance with an aspect of the disclosure, the extrusion device 205 may be configured to extrude at least one blended layer that includes a blend of two or more polymeric materials. In certain embodiments, an extrusion device 205 may be a single screw or a multi-screw (e.g., dual screw, etc.) extruder configured to receive input material and process (e.g., mix, increase the temperature, increase the pressure, etc.) the input material prior to extrusion of one or more film layers by any number of suitable extrusion heads and/or other devices. Any number of suitable extrusion heads or cross heads may be incorporated into or in fluid communication with the extrusion device 205, such as one or more film strip cross heads. As desired, the flow rates of the polymeric material to be extruded may be controlled in order to obtain a desired thickness. Additionally, in certain embodiments, one or more suitable extrusion dies may be utilized to control the thickness and/or shape of the extruded material.

Polymeric material may be provided to the extrusion device 205 via any suitable number of polymer or ingredient sources 210. These source(s) 210 may include any number of suitable microblenders, hoppers, tanks, gravimetric feeders, and/or other components configured to supply one or more polymeric materials to an extrusion device 205. In certain embodiments, a blend of polymeric materials may be provided to an extrusion device 205. In other embodiments, various ingredients may be mixed, blended, or otherwise processed within the extrusion device 205. Additionally, polymeric material may be provided to the extrusion device 205 in a wide variety of suitable states and/or forms. For example, polymeric material may be provided as pelletized material, powders, liquids, and/or in other suitable forms.

With continued reference to FIG. 2A, the system 200 may include any suitable devices configured to control the temperature of one or more extruded film layers following an extrusion process. In certain embodiments, the system 200 may include one or more suitable chill rolls 215A, 215B configured to cool the extruded film layer(s) and/or to smooth or otherwise process one or more surfaces of the film layer(s). Any number of chill rolls 215A, 215B may be utilized as desired. Additionally, each chill roll (generally referred to as chill roll 215) may have any suitable diameter. Each chill roll 215 may also circulate coolant at any desired flow rate in order to effectuate a desired heat transfer from the extruded film layer(s). The heat transfer or cooling rate of a chill roll 215 may be based at least in part upon a wide variety of factors, such as the polymer type(s) that are extruded, the melt temperature, the specific heats of the polymer(s), and the coolant flow rate. Other suitable temperature control devices that may be utilized include, but are not limited to, cooling troughs and/or any other suitable devices configured to lower the temperature of the extruded film layer(s).

In certain embodiments, the one or more extruded film layers may form all of the layers of a film. In other embodiments, one or more additional layers may be combined with the one or more extruded film layers in order to form a film. For example, the system 200 may include one or more pay-offs or other sources configured to supply additional layers (e.g., polymeric layers, etc.) that may be adhered or otherwise attached to the one or more extruded film layers. As another example, the system 200 may include one or more additional extrusion devices configured to form one or more additional layers either on the one or more extruded layers or separately such that the one or more additional layers may be adhered or otherwise attached to the one or more extruded layers. As yet another example, the system 200 may include one or more suitable sources of electrically conductive material (e.g., copper foil) that may be adhered, heat fused, welded, or otherwise attached to the one or more extruded layers. The system 200 may alternatively include one or more suitable devices configured to deposit electrically conductive material onto a film. For example, electrically conductive material may be applied as metallic ink or metallic paint. As other examples, electrically conductive material may be applied via liquid metal deposition, vapor deposition, or additive manufacturing techniques.

The system 200 may further include one or more suitable devices configured to trim the widthwise edges of a film. For example, the system 200 may include one or more suitable edge trim devices 220 configured to cut the film to a desired width. The film may then be provided to one or more suitable take-offs 225, accumulators, or take-up devices. These devices may, for example, apply tension to the film and/or wind the finished film onto a spool. In other embodiments, the film may be provided to one or more downstream devices or components prior to take-off. For example, the film may be provided to one or more components configured to wrap the film around a magnet wire or incorporate the film into another suitable application.

As desired, the system 200 may include any suitable number of sensors and/or devices configured to test a film during and/or following its manufacture. For example, the system 200 may include one or more suitable thickness gauges 230 configured to test the thickness of a film or any number of film layers. As shown in FIG. 2A, one or more thickness gauges may be positioned between the chill rolls 215A, 215B and the edge trim devices 220. Thickness gauges may be positioned at other locations as desired, for example, at locations within the system subsequent to the incorporation of one or more additional layers into a film. Further, a wide variety of suitable thickness gauges may be utilized, such as laser thickness gauges and/or ultrasonic thickness gauges.

In certain embodiments, the system 200 may also include one or more suitable slitting devices 235, such as cutting blades, lasers, etc., that are configured to cut a film into any number of smaller or narrower films. For example, a film may be cut into any number of suitable films having desired finish widths (e.g., widths appropriate for one or more desired film applications).

Additionally, any suitable number of motors, flyers, and/or other devices may be incorporated into the system 200 to control passage of a film through the system 200. Any suitable number of controllers (e.g., control units, computers, microcontrollers, etc.) may be configured to control various components of the system 200. For example, one or more controllers may facilitate synchronization of motors and/or line speeds within the system 200. As desired, a controller and/or combination of controllers may additionally control a wide variety of other parameters, such as the flow rate of materials provided to an extruder 205, the temperature of the extruder 205, the flow rate of coolant provided to the chill rolls 215A, 215B, and/or various testing conducted on the film. Each controller may be a separate component or, alternatively, incorporated into another device or component. Additionally, any number of suitable communications channels (e.g., wired communications channels, wireless communications channels, etc.) may facilitate communication between a controller and one or more other components (e.g., one or more motors, another controller, other devices, etc.).

FIG. 2B illustrates another example system 250 that may be utilized to form extruded film layers for incorporation into a film. The system 250 of FIG. 2B may include components that are similar to those discussed above for the system 200 of FIG. 2A. For example, the system 250 may include an extrusion device 255, one or more sources 260A-D of polymeric material, one or more chill rolls 265A, 265B, an edge trim device 270, and/or a take-off 275. The system 250 may optionally include a wide variety of other components, such as one or more thickness gauges 280 and/or one or more slitting devices 285.

In contrast to the system 200 of FIG. 2A, the system 250 of FIG. 2B may be configured to co-extrude a plurality of insulating layers. The plurality of insulating layers may include any suitable number of blended layers. In certain embodiments, one or more blended layers may be combined with single polymeric material or non-blended layers. In other embodiments, a plurality of blended layers may be extruded for a film. The system 250 may include a plurality of sources 260A-D configured to supply different polymeric materials to the extruder 255. For example, each of the sources 260A-D may supply a respective blended material. As another example, a first subset of the sources 260A-D may supply blended materials and a second subset of the sources 260A-D may supply other materials.

The extrusion device 255 may be configured to receive material from the sources 260A-D and co-extrude a plurality of layers of a film. According to an aspect of the disclosure, at least one of the plurality of film layers may be formed as a blended layer. The extrusion device 255 may be similar to the extrusion device 205 described above with reference to FIG. 2A; however, the extrusion device 255 may include a cross-head or a plurality of cross-heads configured to co-extrude a plurality of layers for a film.

The systems 200, 250 described above with reference to FIGS. 2A-2B are provided by way of example only. A wide variety of other suitable systems may be utilized to form films that include at least one blended layer. These systems may include more or less components than the systems 200, 250 of FIGS. 2A-2B. Additionally, these systems may include certain alternative components to the systems 200, 250 of FIGS. 2A-2B, which are provided by way of non-limiting example only. Indeed, the present disclosure envisions a wide variety of suitable systems that may be utilized to form films.

Figure 3:
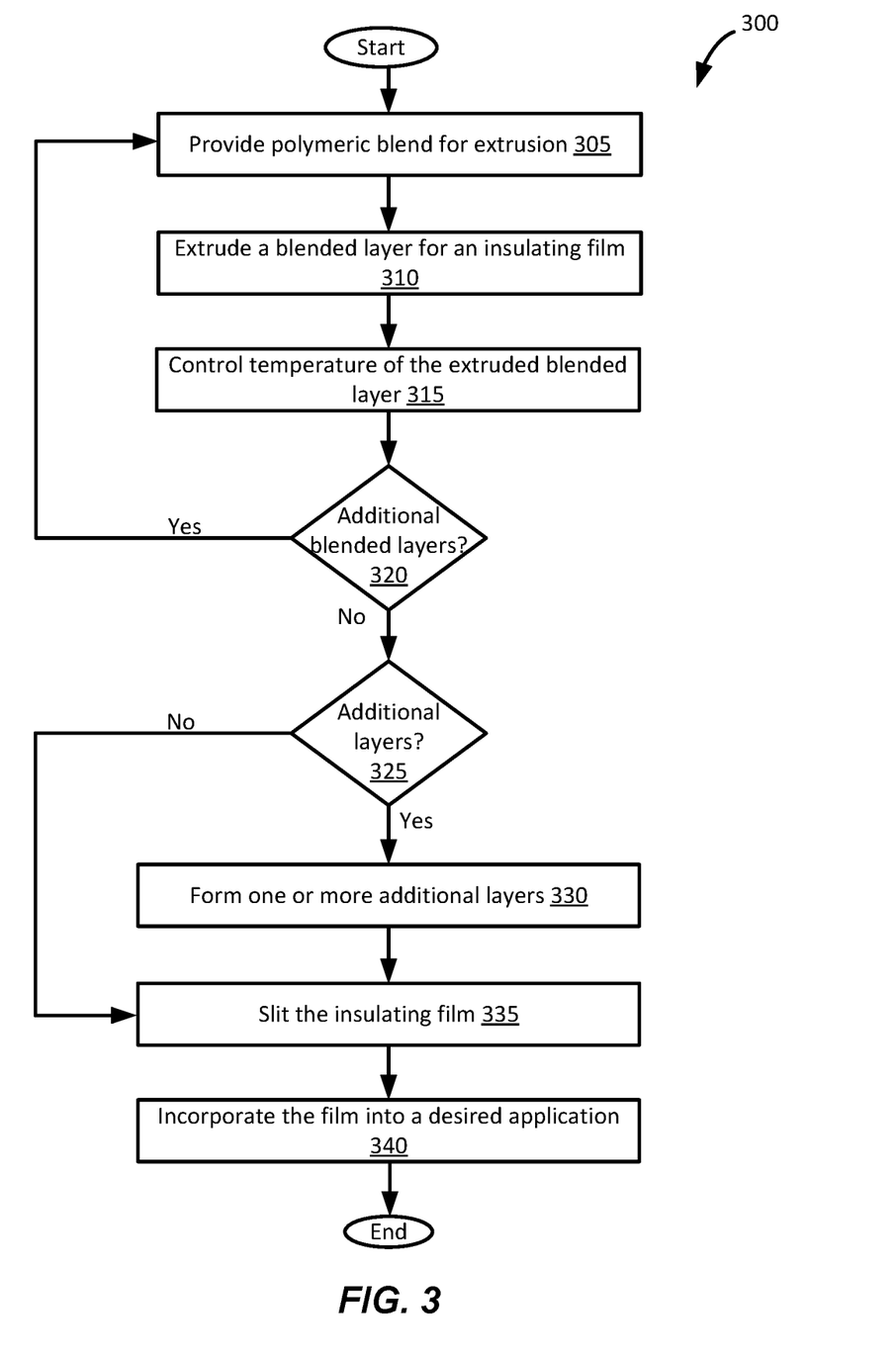
FIG. 3 is a flowchart of an example method form forming a polymeric insulating film, according to an illustrative embodiment of the disclosure.

FIG. 3 is a flowchart depicting an example method 300 for forming an insulating film that includes at least one blended layer, according to an illustrative embodiment of the disclosure. The method 300 may be performed utilizing a wide variety of suitable systems and/or devices. For example, a portion of the method 300 may be performed by either of the systems 200, 250 of FIGS. 2A and 2B. The method 300 may begin at block 305, and a blended thermoplastic material or a polymeric blend may be provided for extrusion. As set forth herein, a wide variety of suitable polymeric blends may be provided. A polymeric blend may include two or more polymeric materials blended or mixed at any suitable blend rate. For example, a polymeric blend may include a suitable combination of polyetheretherketone ("PEEK"), polyetherketoneketone ("PEKK"), polyaryletherketone ("PAEK"), polyetherimide ("PEI"), polyphenylsulfone ("PPSU"), polyethersulfone ("PESU"), polypheylene sulfide ("PPS"), polybenzimidazole ("PBI"), polycarbonate, one or more polyesters (e.g., polyethylene terephthalate ("PET"), etc.), one or more copolyesters, polyamide, and/or thermoplastic polyimide ("TPI"). In certain embodiments, a blend may be formed without any compatabilizers. In other embodiments, one or more compatabilizers may be added to a blend. A wide variety of fillers, and/or other suitable additives may be incorporated into a polymeric blend as desired in various embodiments.

At block 310, a blended layer for incorporation into an insulating film may be formed by extruding the polymeric blend with desired dimensions, such as a desired cross-sectional shape, thickness, and/or width. Any suitable extrusion devices may be utilized to extrude the blended layer. The temperature of the blended layer may then be controlled at block 315 following extrusion. For example, one or more chill rolls may be utilized to cool the blended layer following extrusion.

At block 320, a determination may be made as to whether one or more additional blended layers will be incorporated into an insulating film. If it is determined at block 320 that one or more additional blended layers will not be incorporated (i.e., a desired number of blended layers has been attained), then operations may continue at block 325. If, however, it is determined at block 320 that one or more additional blended layers will be incorporated, then operations may continue at block 305, and an additional blended layer may be extruded. In certain embodiments, an additional blended layer may be formed from similar materials utilized to form a first blended layer. In other embodiments, an additional blended layer may be formed from different materials and/or with a different blending or mixing ratio of materials. Additionally, in certain embodiments, blended layers may be successively extruded during the formation of a film. In other embodiments, a plurality of blended layers may be co-extruded.

At block 325, a determination may be made as to whether one or more additional layers will be incorporated into an insulating film. If it is determined at block 325 that one or more additional layers will not be incorporated, then operations may continue at block 335. If, however, it is determined at block 325 that one or more additional layers will be incorporated, then operations may continue at block 330. At block 330, one or more additional layers of an insulating film may be formed. A wide variety of additional layers may be formed as desired, such as insulating layers formed from single or non-blended polymeric materials, layers of electrically conductive material, etc. Additionally, in certain embodiments, blended and non-blended layers for a film may be successively formed. For example, a blended layer may be formed on a non-blended layer or vice versa. In other embodiments, blended and non-blended layers may be co-extruded. It will be appreciated that an insulating film may be formed with any suitable number of layers.

At block 335, which may be optional in certain embodiments, an insulating film may be slit or cut in order to form a plurality of insulating films. The insulating film may be formed with a first width, and a slitting process may be utilized to form a plurality of insulating films having respective widths that are smaller than the first widths. Each of the plurality of insulating films formed by the slitting process may have any suitable width.

In certain embodiments, the method 300 may end following block 335. In other embodiments, one or more additional operations may be performed at block 340 in order to incorporate the film into a desired application or prepare the film for incorporation into a desired application. For example, in certain embodiments, an insulating film may be provided to a system that produces magnet wire and the insulating film may be helically wrapped around a magnet wire conductor (and any underlying insulation layers). As another example, the insulating film may be cut to desired lengths for incorporation into an electric machine as slot lining. The method 300 may then end following the additional operations.

The operations described and shown in the method 300 of FIG. 3 may be carried out or performed in any suitable order as desired in various embodiments. Additionally, in certain embodiments, at least a portion of the operations may be carried out in parallel. Furthermore, in certain embodiments, less than or more than the operations described in FIG. 3 may be performed.

Polymeric insulating films formed in accordance with the present disclosure, such as any of the films 100, 110, 125 illustrated in FIGS. 1A-1C, may be utilized in a wide variety of suitable applications. These applications include, but are not limited to, insulating layers formed around magnet wire, slot insulation in motors, transformers, and/or other electrical devices, and/or printed circuit board applications. A few example applications are described in greater detail below with reference to FIGS. 4-6.

Figure 4:
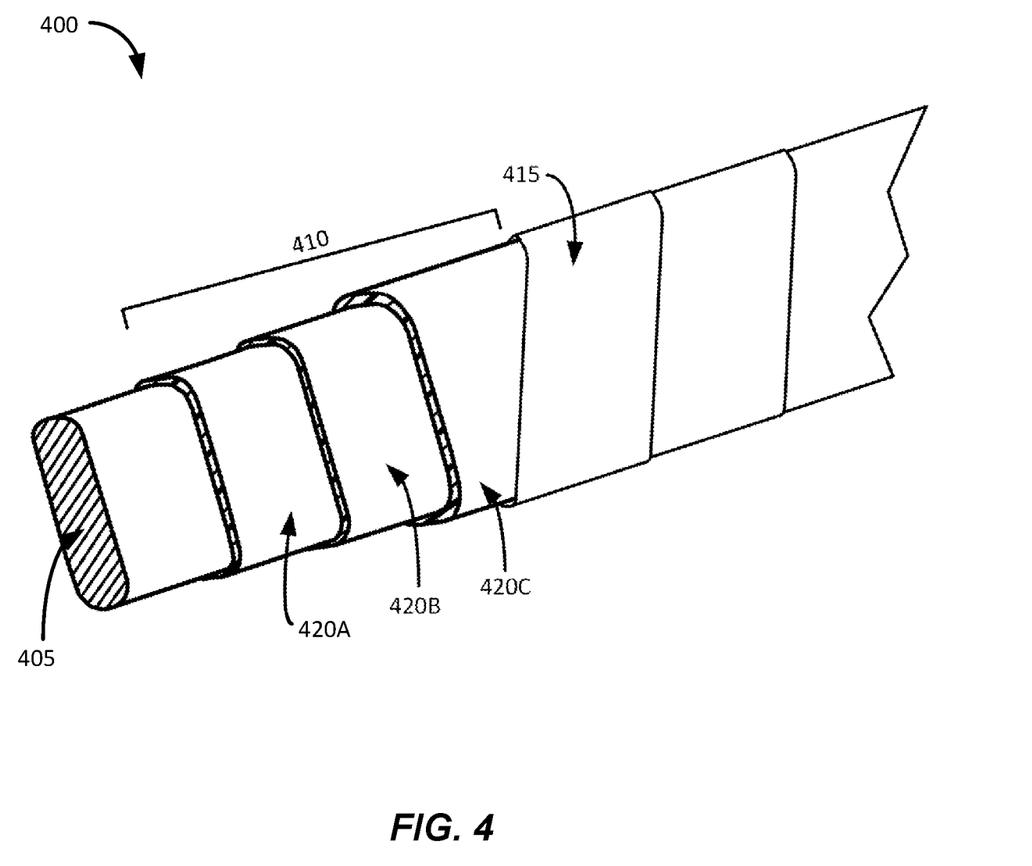
FIG. 4 is a perspective view of an example magnet wire that includes at least one polymeric insulating film, according to an illustrative embodiment of the disclosure.

FIG. 4 illustrates a perspective view of an example magnet wire 400 that may include insulation formed from a film having at least one blended layer. The magnet wire 400 may include a central conductor 405, optional base insulation 410 formed around the central conductor 405, and a polymeric insulating film 415 wrapped or otherwise positioned around the conductor 405 and any base insulation 410. As desired, the base insulation 410 may include any number of sublayers, such as the three sublayers 420A-C illustrated in FIG. 4.

Figure 5A:
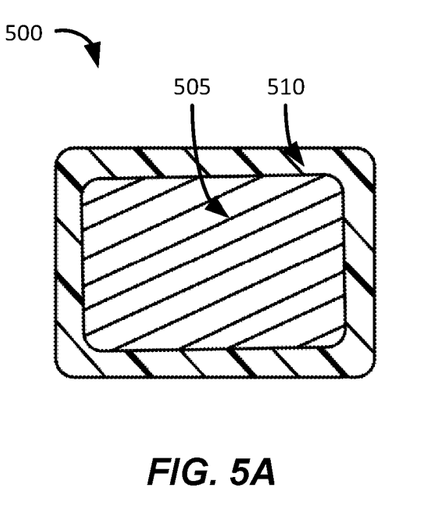
FIGS. 5A-5D are cross-sectional views of example magnet wire constructions that include at least one polymeric insulating film, according to illustrative embodiments of the disclosure.
Figure 5B:
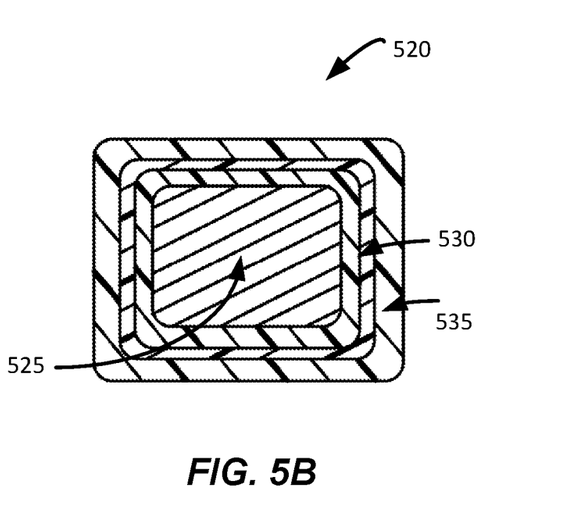
Figure 5C:
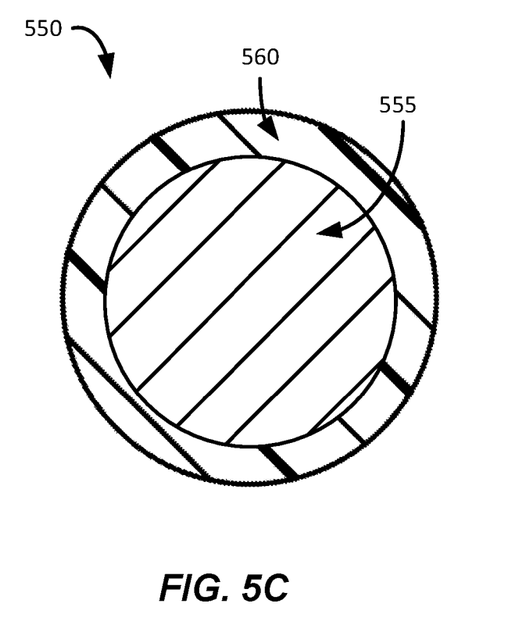
Figure 5D:
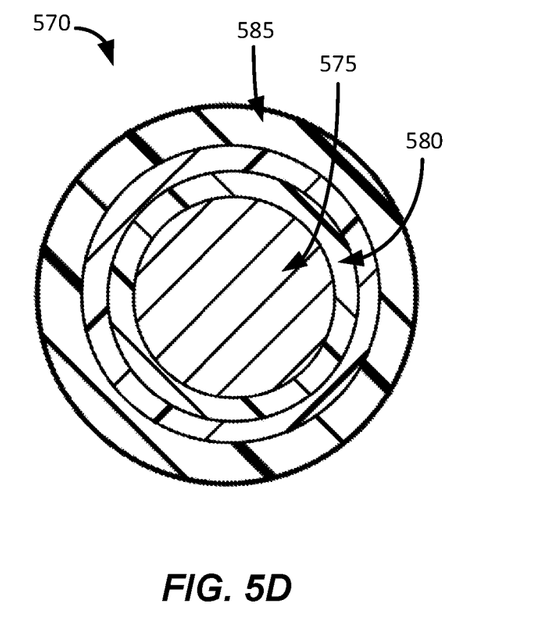

FIGS. 5A-5D are cross-sectional views of example magnet wire constructions 500, 520, 550, 570 that include a film having at least one blended layer, according to illustrative embodiments of the disclosure. FIG. 5A illustrates an example magnet wire 500 having a rectangular cross-sectional shape in which a polymeric insulating film 510 is formed around a conductor 505. FIG. 5B illustrates another example magnet wire 520 having a rectangular cross-sectional shape. However, the magnet wire 520 of FIG. 5B includes a conductor 525, base insulation 530 formed around the conductor 525, and a polymeric insulating film 535 formed around the base insulation 530. FIG. 5C illustrates an example magnet wire 550 having a round or circular cross-sectional shape in which a polymeric insulating film 560 is formed around a conductor 555. FIG. 5D illustrates another example magnet wire 570 having a round cross-sectional shape. However, the magnet wire 570 of FIG. 5D includes a conductor 575, base insulation 580 formed around the conductor 575, and a polymeric insulating film 585 formed around the base insulation 580. Indeed, a magnet wire may be formed with a wide variety of suitable cross-sectional shapes and insulation configurations.

Each of the layers or components of the magnet wire 400 of FIG. 4 will now be described in greater detail. It will be appreciated that the example magnet wires 500, 520, 550, 570 of FIGS. 5A-5D may include layers or components that are similar to those described with reference to FIG. 4. Indeed, any suitable number of insulation layers may be incorporated into a magnet wire as desired. The example constructions illustrated in FIGS. 5-5D are provided by way of non-limiting example only.

Turning first to the conductor 405, the conductor 405 may be formed from a wide variety of suitable materials and or combinations of materials. For example, the conductor 405 may be formed from copper, aluminum, annealed copper, oxygen-free copper, silver-plated copper, nickel plated copper, copper clad aluminum ("CCA"), silver, gold, a conductive alloy, a bimetal, carbon nanotubes, or any other suitable electrically conductive material. Additionally, the conductor 405 may be formed with any suitable dimensions and/or cross-sectional shapes, such as a circular or rectangular shape. As desired for certain cross-sectional shapes such as a rectangular cross-sectional shape, a conductor 405 may have corners that are rounded, sharp, smoothed, curved, angled, truncated, or otherwise formed.

The conductor 405 may also be formed with any suitable dimensions, such as any suitable gauge, diameter, height, width, cross-sectional area, etc. For the illustrated rectangular conductor 405, the longer sides may be between approximately 0.020 inches (508 μm) and approximately 0.750 inches (19050 μm), and the shorter sides may be between approximately 0.020 inches (508 μm) and approximately 0.400 inches (10160 μm). An example square conductor may have sides between approximately 0.020 inches (508 μm) and approximately 0.500 inches (12700 μm). An example round conductor may have a diameter between approximately 0.010 inches (254 μm) and approximately 0.500 inches (12700 μm). Other suitable dimensions may be utilized as desired, and the described dimensions are provided by way of example only.

A wide variety of suitable methods and/or techniques may be utilized to form, produce, or otherwise provide a conductor 405. In certain embodiments, a conductor 405 may be formed by drawing an input material (e.g., a larger conductor, etc.) with one or more dies in order to reduce the size of the input material to desired dimensions. As desired, one or more flatteners and/or rollers may be used to modify the cross-sectional shape of the input material before and/or after drawing the input material through any of the dies. In certain embodiments, the conductor 405 may be formed in tandem with the application of a portion or all of the insulation system. In other words, conductor formation and application of insulation material may be conducted in tandem. In other embodiments, a conductor 405 with desired dimensions may be preformed or obtained from an external source. Insulation material may then be applied or otherwise formed on the conductor 405.

In certain embodiments, base insulation 410 may be formed on the conductor 405 prior to application of a polymeric insulating film 415. In other words, the base insulation 410 may be formed as first insulation, and the film 415 may be formed as second insulation over the base insulation 410. A wide variety of suitable materials may be utilized as desired to form base insulation 410. For example, the base insulation 410 may include one or more layers of polymeric enamel, one or more semi-conductive layers, and/or one or more extruded layers of material. In certain embodiments, the base insulation 410 may be formed directly on the conductor 405, for example, around an outer periphery of the conductor 405. Additionally, as desired, the base insulation 410 may include a single layer of insulation material or a plurality of sublayers of insulation material, such as sublayers 420A-C.

In the event that the base insulation 410 is formed from a plurality of sublayers, any number of sublayers may be utilized. In certain embodiments, the sublayers may be formed from the same substance or material. For example, the sublayers may be formed as a plurality of enamel layers, and each enamel layer may be formed from the same polymeric material. In other embodiments, at least two of the sublayers may be formed from different materials. For example, different enamel layers may be formed from different polymeric materials. As another example, one or more sublayers may be formed from enamel while another sublayer is formed from extruded material.

In certain embodiments, the base insulation 410 may include one or more layers of enamel. An enamel layer is typically formed by applying a polymeric varnish to the conductor 405 and then baking the conductor 405 in a suitable enameling oven or furnace. Typically, the polymeric varnish includes polymeric solid material suspended in one or more solvents. Following application of the varnish, solvent is removed as a result of baking or curing, thereby leaving a solid polymeric enamel layer. As desired, multiple layers of enamel may be applied to the conductor 405. For example, a first layer of enamel may be applied, and the conductor 405 may be passed through an enameling oven or other suitable curing device. A second layer of enamel may then be applied, and the conductor 405 may make another pass through the curing device (or a separate curing device). This process may be repeated until a desired number of enamel coats have been applied and/or until a desired enamel thickness or build has been achieved. As desired, an enameling oven may be configured to facilitate a wire 400 making multiple passes through the oven. Other curing devices that may be utilized in addition to or as an alternative to one or more enameling ovens include, but are not limited to, infrared light systems, ultraviolet light systems, and/or electron beam systems.

Any number of enamel layers may be formed as desired in various embodiments. Additionally, each layer of enamel and/or a total enamel build may have any desired thickness. A wide variety of different types of polymeric materials may be utilized as desired to form an enamel layer. Examples of suitable materials include, but are not limited to, polyimide, polyamideimide, amideimide, polyester, polyesterimide, poly sulfone, polyphenylenesulfone, poly sulfide, polyphenylenesulfide, polyetherimide, polyamide, polyketones, etc. In certain embodiments, the base insulation 410 may include polyimide ("PI") and/or polyamideimide ("PAI") enamel.

As desired, one or more suitable filler materials may be incorporated into an enamel layer. Examples of suitable filler materials include, but are not limited to, inorganic materials such as metals, transition metals, lanthanides, actinides, metal oxides, and/or hydrated oxides of suitable materials such as aluminum, tin, boron, germanium, gallium, lead, silicon, titanium, chromium, zinc, yttrium, vanadium, zirconium, nickel, etc.; suitable organic materials such as polyaniline, polyacetylene, polyphenylene, polypyrrole, other electrically conductive particles; and/or any suitable combination of materials. In certain embodiments, the filler material(s) may enhance corona resistance and/or one or more thermal properties (e.g., temperature resistance, cut-through resistance, heat shock, etc.) of an enamel layer. The particles of a filler material may have any suitable dimensions, such as any suitable diameters. In certain embodiments, a filler material may include nanoparticles. Further, any suitable blend or mixture ratio between filler material and the polymeric material of an enamel layer may be utilized.

As desired, other types of base insulation 410 may be utilized in addition to or as an alternative to enamel. For example, in certain embodiments, the base insulation 410 may include one or more semi-conductive layers of material. A semi-conductive layer may have a conductivity between that of a conductor 405 and that of an insulator. As another example of base insulation 410, one or more extruded layers may be formed around the conductor 405. A wide variety of suitable materials and/or combinations of materials may be utilized to form an extruded layer of insulation. Examples of suitable materials include, but are not limited to, polyetheretherketone ("PEEK"), polyetherketoneketone ("PEKK"), polyetheretherketoneketone ("PEEKK"), polyetherketone ("PEK"), polyaryletherketone ("PAEK"), other suitable polymers that include at least one ketone group, polyetherimide ("PEI") such as Ultem® marketed by Sabic Global Technologies, polyphenylsulfone ("PPSU") such as Radel® marketed by Solvay Specialty Polymers USA, polyethersulfone ("PESU"), polypheylene sulfide ("PPS"), polybenzimidazole ("PBI"), polycarbonate, one or more polyesters (e.g., polyethylene terephthalate ("PET"), etc.), one or more copolyesters, polyamide, and/or thermoplastic polyimide ("TPI"). In certain embodiments, an extruded layer may be formed from a polymeric blend in a similar manner as that described above for polymeric insulating films.

With continued reference to FIG. 4, one or more suitable film layers 415, wraps or tapes, may be wrapped around the conductor 405. In certain embodiments, one or more polymeric films 415 may be formed directly around the conductor 405 without any intervening insulation layers. In other embodiments, one or more polymeric films 415 may be formed over base insulation 410. According to an aspect of the disclosure, at least one polymeric film may include one or more layers formed as blended layers. As set forth in greater detail above, a wide variety of suitable materials and blend ratios may be utilized in polymeric film layers.

Additionally, a wide variety of suitable methods and/or techniques may be utilized to wrap a polymeric insulating film around a conductor 405. For example, one or more suitable devices may be utilized to helically wrap an insulating film around a conductor 405. As desired, a plurality of insulating films may be wrapped around a conductor 405. For example, a plurality of films may be helically wrapped in the same direction or, alternatively, at least two films may be contra-helically wrapped around a conductor 405. Additionally, each film wrapped around a conductor 405 may be wrapped at any suitable angle.

The magnet wires 400, 500, 520, 550, 570 described above with reference to FIGS. 4-5D are provided by way of example only. A wide variety of alternatives could be made to the illustrated magnet wires 400, 500, 520, 550, 570 as desired in various embodiments. For example, a wide variety of different types of insulation layers may be incorporated into a magnet wire in addition to a polymeric insulating film. As another example, the cross-sectional shape of a magnet wire and/or one or more insulation layers may be altered. Indeed, the present disclosure envisions a wide variety of suitable magnet wire constructions.

Figure 6:
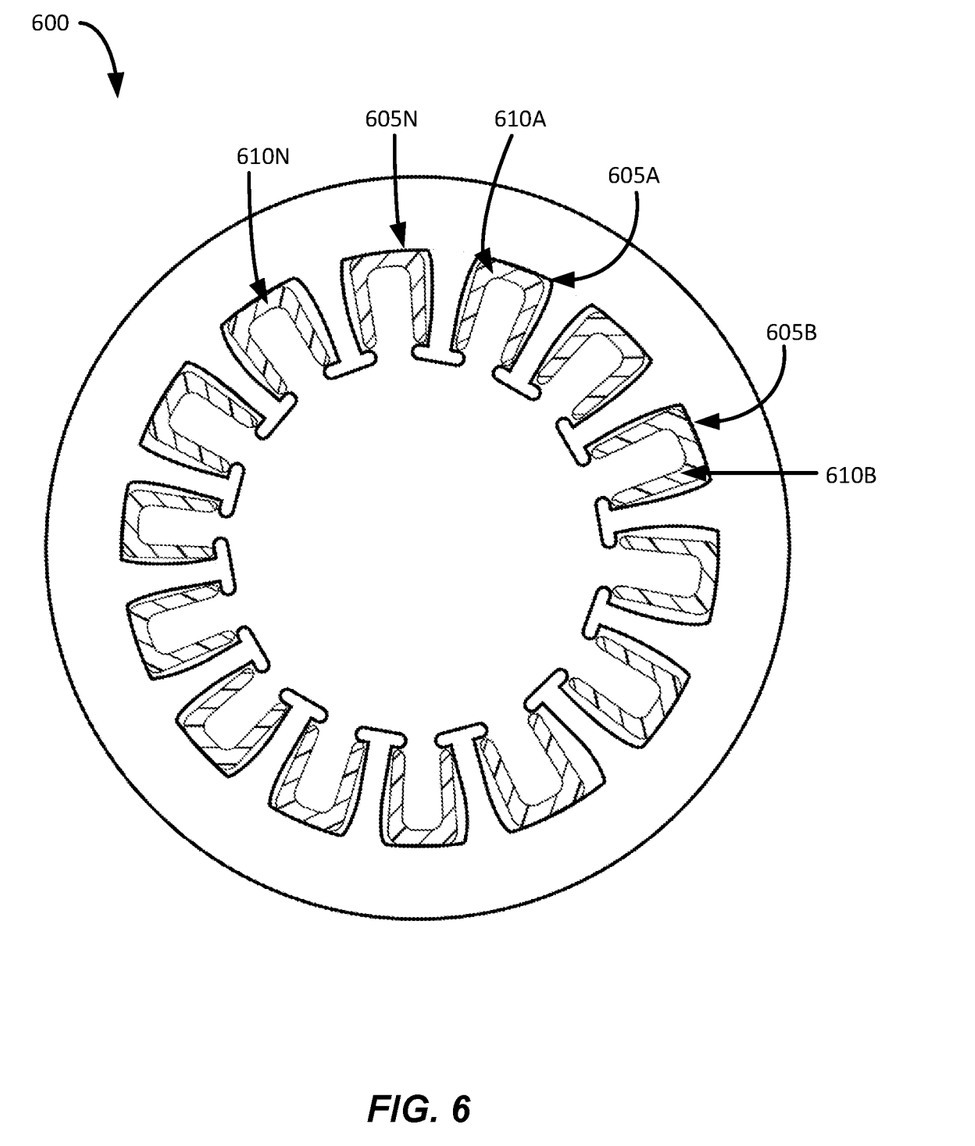
FIG. 6 is a cross-sectional view of an example electrical device component that includes at least one polymeric insulating film, according to an illustrative embodiment of the disclosure.

As set forth above, one or more polymeric insulating films may be incorporated into motors, transformers, rotating electrical devices, and/or other electrical devices. For example, polymeric insulating films may be utilized as slot insulation in a motor or other suitable device. FIG. 6 illustrates a cross-sectional view of an example electrical device (e.g., motor, etc.) component 600 that incorporates polymeric films as slot insulation. The component 600 may be a stator, rotor, or other suitable component 600 that includes a plurality of slots 605A-N into which windings or conductors may be positioned. For example, a component 600 may include a plurality of slots 605A-N formed around an inner or outer periphery. In certain embodiments, each slot (generally referred to as slot 605) may be defined by respective teeth. Additionally, in certain embodiments, the slots 605A-N and teeth may be formed from a laminated steel structure incorporated into the component 600.

As desired, one or more polymeric insulating films 610A-N may be respectively positioned within one or more of the slots 605A-N. The polymeric insulating films 610A-N may function as shielding material between the laminated structure and windings or conductors that are positioned within the slots 605A-N. The polymeric insulating films 610A-N may be formed, slit, or otherwise sized in order to fit within corresponding slots 605A-N.

Polymeric insulating films may be incorporated into a wide variety of other suitable applications as desired. For example, polymeric insulating films may be incorporated into printed circuit boards, other electronic devices, and/or solar panel applications. The applications discussed above with reference to FIGS. 4-6 are provided by way of non-limiting example only.

EXAMPLES

As set forth above, a wide variety of suitable polymeric blends may be utilized to form blended layers of polymeric insulating films. The examples set forth below in Table 1 are intended as illustrative and non-limiting, and represent specific embodiments of the present disclosure in which various polymeric blends are utilized to form polymeric insulating films. The polymeric insulating films were then wrapped around wire samples for testing. For consistency, the wire samples were all prepared as rectangular wire having a conductor width of approximately 3.384 mm and a conductor thickness of approximately 1.834 mm with a tolerance of +/−0.015 mm. The conductors were formed from oxygen free copper. Additionally, base insulation was formed on the wires from polyamideimide ("PAI"). In other embodiments, conductors may be formed with different dimensions. Additionally, other base insulation such as polyimide enamel may be utilized as desired. In other embodiments, a polymeric insulating film may be wrapped directly around a conductor.

With reference to Table 1, various polymeric blend formulations are provided. For each polymeric blend, weight percentages of polymeric materials utilized to form the relevant polymeric blend are provided. Additionally, a control sample of extruded single material PEI (e.g., Ultem 1000) is provided for comparison to the polymeric blends. For each type of extruded polymeric film, a thickness of the extruded film is provided. Additionally, measured performance criteria for the extruded samples are provided. First, measured PDIV values at 25° C. are provided. Dielectric breakdown values taken for a shotbox test are also provided. In a shot box test, a sample is submerged in shot balls and tested until failure. Cut through temperatures are also provided. Further, each sample was found to satisfy several industry standard tests, such as flexibility tests, heat shock tests, bend tests, and oil resistance tests.

TABLE 1

| | Formulation | | | | | | |
|---|---|---|---|---|---|---|---|
| | PESU 90 PPSU 10 | PESU 50 PPSU 50 | PPSU 70 PEEK 30 | PEI 70 PEEK 30 | PEI 90 PEEK 10 | PPSU 50 Ultem 50 | Ultem 1000 |
| Thickness (μm) | 215 | 395 | 196 | 194 | 200 | 196 | 162 |
| PDIV Vp 25° C. | 1905 | 1749 | 1668 | 1470 | 1470 | 1795 | 1770 |
| DB Shotbox Volts | 11830 | 15413 | 16821 | 13321 | 15120 | 16257 | 16059 |
| Cut Through (° C.) | 395 | 380 | 370 | 376 | 381 | 380 | 390 |
| Flexibility 25% | Pass | Pass | Pass | Pass | Pass | Pass | Pass |
| Flexibility 0-90° | Pass | Pass | Pass | Pass | Pass | Pass | Pass |
| Flexibility 0-300° | Pass | Pass | Pass | Pass | Pass | Pass | Pass |
| Heat Shock 10% Elong. 220° 1 hour | Pass | Pass | Pass | Pass | Pass | Pass | Pass |
| Heat Shock 175° 0.5 hrs | Pass | Pass | Pass | Pass | Pass | Pass | Pass |
| Bend/190° 1000 hours | Pass | Pass | Pass | Pass | Pass | Pass | Pass |
| Oil Resist. 150° ATF 0.2% Water | Pass | Pass | Pass | Pass | Pass | Pass | Pass |

As shown in Table 1, certain polymeric blends may provide similar or better performance than conventional single polymer extruded materials (e.g., PEI or Ultem, etc.). For example, certain polymeric blends may provide enhanced PDIV and/or dielectric breakdown performance. Additionally, certain polymeric blends may be cheaper to manufacture or produce than conventional single polymer materials.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An insulating film comprising:
   at least one layer formed from extruded material, the extruded material comprising a blend of a first polymeric material and a second polymeric material different than the first polymeric material, wherein the first polymeric material comprises no more than 35 percent by weight of the blend, and wherein the blend comprises one of:
   polyphenylsulfone as the first polymeric material and polyethersulfone as the second polymeric material; or
   polyetheretherketone as the first polymeric material and polyphenylsulfone as the second polymeric material.

2. The insulating film of claim 1, wherein the first polymeric material comprises polyetheretherketone, the second polymeric material comprises polyphenylsulfone, and the blend further comprises a third polymeric material.

3. The insulating film of claim 2, wherein the third polymeric material comprises polyethersulfone.

4. The insulating film of claim 1, wherein the first polymeric material comprises a semi-crystalline material and the second polymeric material comprises an amorphous material.

5. The insulating film of claim 1, wherein the blend does not include any compatabilizer.

6. The insulating film of claim 1, wherein the blend further comprises a compatabilizer.

7. The insulating film of claim 1, wherein the blend further comprises a filler material.

8. The insulating film of claim 7, wherein the filler material comprises at least one of titanium dioxide, boron nitride, porous boron nitride, or silica dioxide.

9. An insulating film comprising:
   at least one layer formed from extruded material, the extruded material comprising a blend of polyetheretherketone as a first polymeric material and polyphenylsulfone as a second polymeric material, wherein the first polymeric material comprises no more than 35 percent by weight of the blend.

10. The insulating film of claim 9, wherein the blend further comprises a third polymeric material.

11. The insulating film of claim 10, wherein the third polymeric material comprises polyethersulfone.

12. The insulating film of claim 9, wherein the blend does not include any compatabilizer.

13. The insulating film of claim 9, wherein the blend further comprises a filler material.

14. The insulating film of claim 13, wherein the filler material comprises at least one of titanium dioxide, boron nitride, porous boron nitride, or silica dioxide.

15. A magnet wire comprising:
   a conductor; and
   insulating film formed around the conductor, the insulating film comprising:
   at least one layer formed from extruded material, the extruded material comprising a blend of polyetheretherketone as a first polymeric material and polyphenylsulfone as a second polymeric material, wherein the first polymeric material comprises no more than 35 percent by weight of the blend.

16. The magnet wire of claim 15, wherein the blend further comprises a third polymeric material.

17. The magnet wire of claim 16, wherein the third polymeric material comprises polyethersulfone.

* * * * *